Sept. 6, 1949.    R. W. LEWIS ET AL    2,480,941
COMPOSITE RECEPTACLE FOR FLAT
CELLS AND METHOD OF MAKING
Filed Aug. 4, 1947
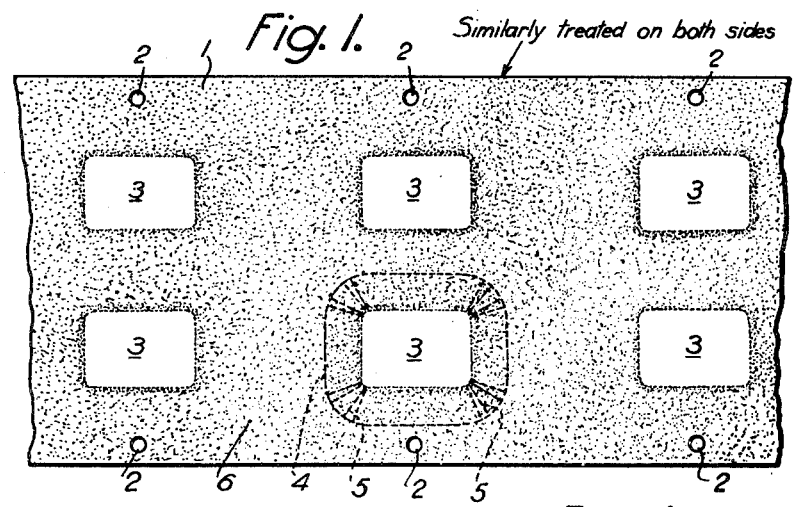
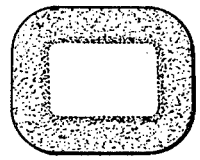
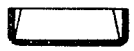
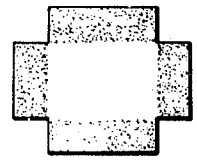
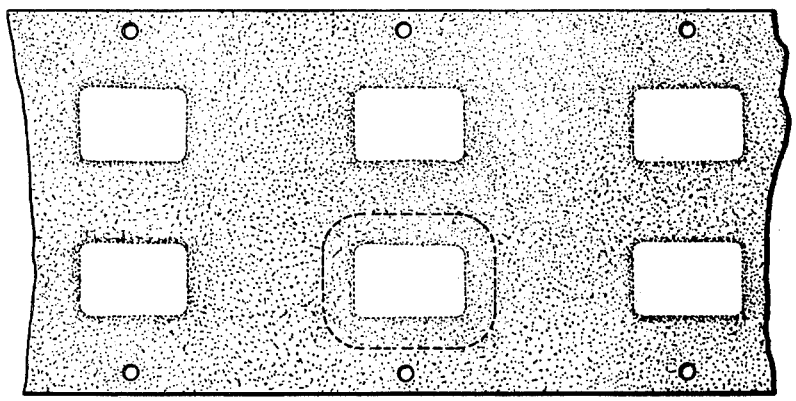
INVENTORS
Richard Walter Lewis
& Leonard Richard Rowe
BY R. E. O'Dell
ATTORNEY.

Patented Sept. 6, 1949

2,480,941

UNITED STATES PATENT OFFICE 2,480,941

COMPOSITE RECEPTACLE FOR FLAT CELLS AND METHOD OF MAKING

Richard Walter Lewis, Dundee, Scotland, and Leonard R. Rowe, South Shields, England, assignors to Burndept Limited, Erith, England, a company of Great Britain Application August 4, 1947, Serial No. 765,965
In Great Britain January 18, 1946

Section 1, Public Law 690, August 8, 1946
Patent expires January 18, 1966

5 Claims. (Cl. 136—175)

This invention relates to electric dry batteries of the layer type and specifically to the manufacture of batteries of this kind having a composite electrode in the form of a shallow cup or pan of electro-negative metal coated with carbon, which contains the remaining elements of the cell and nests within a similar composite electrode of the next cell of the battery. Such a battery has been described in copending application Serial No. 562,994 and methods and apparatus for its manufacture have been described in copending applications Serial Nos. 765,963, 765,961, 765,964, and 765,962, which have since become abandoned, relating respectively to Battery electrode manufacture, Handling battery components, Assembling dry batteries and Battery filling plant.

It is obvious that the nesting electrodes must be insulated from each other or every cell will be short-circuited. We have found it desirable to insulate the nesting electrodes one from the other by sheet insulating material, and not merely by a coating of insulating varnish upon the electrode; and in copending application Serial No. 562,994 it has been proposed to employ for so insulating the electrodes the bibulous sheet, or one of the bibulous sheets, employed to carry the electrolyte of the dry cell. For this purpose the bibulous sheet, instead of merely covering the bottom of the cup electrode, is extended to line the sides of the cup and even project beyond its lip, and the part of this lining which separates the nesting electrodes is made non-bibulous and insulating by impregnating it with paraffin wax or other insulator.

Our present invention is concerned with improved methods of manufacture of cells of this kind in respect of their insulation from one another, its purpose being to lessen the cost of manufacture and to increase the reliability of the insulation of the electrodes and of the sealing of the cells.

With this purpose in view one object of our invention is a method of making electrolyte-retaining and cell insulating sheets which includes the step of continuously printing upon a band of bibulous material a pattern of insulating material having unprinted spaces therein of the size of the bottom of a cup-shaped electrode separated by printed spaces of a width exceeding twice the depth of the cup-shaped electrode.

A further object of the invention is a method of producing electrolyte-retaining and cell-insulating sheets, which includes the steps of cutting registration openings in a band of bibulous material, printing said band on one side with a pattern in insulating ink presenting spaced unprinted areas, printing said band on the other side with a similar pattern in insulating ink presenting spaced unprinted areas having the same relation to said registration openings as the unprinted areas on the already printed side and therefore registering with said unprinted areas on the already printed side, and severing from said band sheets having such relation to said registration openings that each includes one centrally placed unprinted area.

A further object of the invention is an electrolyte-retaining cell-insulating sheet having its margin printed on both sides with insulating ink.

Yet another object of the invention is a method of making dry cells of the layer type which includes the steps of printing a band of zinc foil with a pattern of insulating ink presenting spaced unprinted areas, punching from said band cup-shaped electrodes having an unprinted space at the bottom and an insulating margin on their inner surface, printing a bad of bibulous material on both sides with a similar pattern in insulating ink, the unprinted spaces on the two sides being in register, cutting from said band lining sheets for said cup-shaped electrodes and assembling a lining sheet in each electrode.

Yet another object of the invention is a method of making electrolyte-retaining cell-insulating sheets which includes the steps of printing a band of bibulous paper material on each side with a pattern of insulating ink presenting spaced unprinted areas, the uprinted areas on the one side being opposite the unprinted areas on the other side, cutting from said band lining sheets each including one centrally placed unprinted space, radially crimping the corners of said sheets and thereafter folding substantially at right angles the marginal portions of said sheet.

These and other objects of the invention will be better understood from the following detailed description of the carrying out of the invention, referring to the accompanying drawing in which, Figure 1 shows a portion of a printed band prepared in accordance with the invention;

Figure 2 shows an electrolyte-retaining cell-insulating sheet severed from the band;

Figure 3 is a cross section of the sheet of Figure 2 after its margins have been folded substantially at right angles;

Figure 4 shows an alternative form of sheet that may be cut from the band of Figure 1;

Figure 5 shows a band of zinc foil imprinted with an insulating pattern in the course of manufacture of the cell electrodes to be insulated by sheets such as shown in Figure 3 or 4;

Figure 6 shows in cross section a shallow cup electrode punched from the sheet of Figure 5 and lined with the sheet of Figure 3.

In the drawing 1 indicates a portion of a band of bibulous material, usually a paper product such as thin card, suitable to absorb and retain a quantity of electrolyte. The sheet may be of any convenient width and length, the length being usually considerable.

The band is first punched with perforations 2, notches or other registration marks by which it may be accurately positioned relatively to printing elements. It is then printed with such a pattern as indicated using an insulating ink 6, such as a bituminous product softened or dissolved by any suitable solvent. Or the ink may consist of a synthetic insulating plastic suitably plasticised or dissolved. It is important to choose an ink which remains flexible after drying. By this means substantially the whole surface of the band is coated on one side with an insulating skin formed by the dry ink, save for spaced unprinted areas 3 of the size and shape of the active areas of the cell electrode, that is to say of the bottom of the cup-shaped electrode in which the remaining elements of the cell are to be assembled. As will be understood from the steps of the process later described the unprinted areas 3 should be spaced from one another by printed areas of a width not less than twice the depth of the cup-shaped electrode, since these areas come to form the lining of one side of each of two cells; and they should be spaced from the perforations 2 by a printed area of a width at least equal to the depth of the cup-shaped electrode.

This operation may be done with quite a simple form of printing machine. All that is required is a bank of contacting rollers, one of them dipping into a trough containing the ink, for distributing the ink over a printing cylinder rotating in contact with the last of the inking rollers. The pattern to be printed may be formed on the printing cylinder in any well known fashion; it is sufficient to use a hollow printing cylinder and cut openings in its wall of the size and spacing of the desired unprinted areas. The printing cylinder should be formed with teeth or radially projecting pins to enter the registration openings 2 and so maintain a definite relation between the positions of the unprinted areas 3 and the registration openings.

After printing the band is passed through an oven which evaporates the volatile constituents of the ink and melts the bitumen or plastic so that it penetrates into the band. The band is then passed through a similar printing machine or is passed a second time through the printing machine, to print the same pattern upon the other side of the band and the succeeding heating completes the impregnation of the band. The engagement of the registration openings 2 with the registering means on the printing cylinder ensures that the blank spaces 3 on the one side of the band are opposite those on the other side.

There are then punched or otherwise cut from the band sheets such as indicated by the dotted outline 4 and shown separately in Figure 2, each including a centrally placed unprinted space surrounded by a printed margin wide enough to line the walls of an electrode cup. The punching machine should have registering means positioned in relation to the punch in the same way that the registration openings 2 are positioned in relation to the printed pattern, these registering means engaging the registration openings.

The punching machine may also crimp the corners of the punched sheet, on radial lines, for instance as indicated at 5. When the punched sheet is shaped to cup form by folding its marginal portions at right angles to its unprinted centre as shown in Figure 3, for instance by thrusting the sheet into a cup electrode as explained in R. P. Richardson's copending application Serial No. 765,964 which has since become abandoned (Assembling dry batteries) and as shown in Figure 6, the crimping causes the corners of the sheet to fold into tapered box pleats, thereby taking up the excess material at the folded corner. Alternatively the punch of the machine described in the application just mentioned may be shaped to form such a pleat in the course of thrusting the lining sheet into a cup electrode.

Instead of crimping the sheet the punch may cut out the corner altogether as shown in Figure 4. The cut edges come together when the sheet is folded by being pressed into the cup, and the bitumen impregnating it flows sufficiently to seal the joint.

The insulation between cells of a pile may be still further improved by similarly printing the zinc band from which the cup blanks are struck. A band so printed is shown in Figure 5. The ink in this case should be of the nature of a varnish strongly adherent to the metal, and still flexible enough when dry not to be gravely damaged by the further steps of shaping the zinc blank to cup form, coating its outer surface with carbon, and assembling with other elements of the cell as described in R. P. Richardson's copending applications Nos. 765,963, 765,964, and 765,962 (Battery electrode manufacture, Assembling dry batteries and Battery filling plant).

The metal band should be printed on the side which is to form the exterior surface of the cup, and which is subsequently coated with carbon, but it may be printed on both sides.

We claim:

1. A method of making electrolyte-retaining cell-insulating sheets which includes the steps of printing a band of bibulous paper product on each side with a pattern of insulating ink presenting spaced unprinted areas, the unprinted areas on the one side being opposite the unprinted areas on the other side, cutting from said band lining sheets each including one centrally placed unprinted space, radially crimping the corners of said sheets and thereafter folding substantially at right angles the marginal portions of said sheets.

2. A method of making electrolyte-retaining cell-insulating sheets which includes the steps of printing a band of bibulous paper product on each side with a pattern of insulating ink presenting spaced unprinted areas, the unprinted areas on the one side being opposite the unprinted areas on the other side, cutting from said band lining sheets each including one centrally placed unprinted space, radially cutting and removing the corners of said sheets and thereafter folding substantially at right angles the marginal portions of said sheets.

3. In a layer type dry battery having cup-shaped nesting electrodes, an electrolyte-retaining cell-insulating sheet lining the bottom and sides of each electrode, comprising a sheet of bibulous material having its margin, and only its margin, printed on both sides with an insulating ink.

4. In a layer type dry battery, cup-shaped nesting electrodes having their margins printed with insulating ink, in combination with electrolyte-retaining cell-insulating sheets lining the bottom and sides of said electrodes and having their margin printed on both sides with insulating ink, the unprinted areas of the two sides of each said lining sheet being in register with each other and with the unprinted area of the electrode which the sheet lines.

5. In a layer type dry battery, cup-shaped nesting electrodes having their margins printed with insulating ink, in combination with electrolyte-retaining cell-insulating sheets lining the bottom and sides of said electrodes, crimped at their corners and folded substantially at right angles at their margin, and having their margin printed on both sides with insulating ink, the unprinted areas of the two sides of each said lining sheet being in register with each other and with the unprinted area of the electrode which the sheet lines.

RICHARD WALTER LEWIS.
LEONARD R. ROWE.

REFERENCES CITED

The following references are of record in the file of this patent:

UNITED STATES PATENTS

| Number | Name | Date |
|---|---|---|
| Re. 13,214 | Josz | Feb. 28, 1911 |
| 946,009 | Byrne | Jan. 11, 1910 |
| 1,375,306 | Maisel | Apr. 19, 1921 |
| 1,705,405 | Hodler | Mar. 12, 1929 |
| 1,736,826 | Horst | Nov. 26, 1929 |
| 1,819,041 | Sherman | Aug. 18, 1931 |
| 2,053,058 | Wuillot | Sept. 1, 1936 |
| 2,272,969 | French | Feb. 10, 1942 |

FOREIGN PATENTS

| Number | Country | Date |
|---|---|---|
| 284,626 | Great Britain | Apr. 25, 1929 |
| 389,185 | Great Britain | Mar. 16, 1933 |
| 526,301 | Great Britain | Sept. 13, 1940 |
| 4,512 | Great Britain | 1904 |